United States Patent [19]

Lovercheck

[11] 4,424,771
[45] Jan. 10, 1984

[54] HYDRIDE COLD STARTER IN ALCOHOL FUEL TREATMENT AND DISTRIBUTION APPARATUS AND METHOD

[75] Inventor: Dale R. Lovercheck, Pittsburgh, Pa.
[73] Assignee: Conoco Inc., Wilmington, Del.
[21] Appl. No.: 410,781
[22] Filed: Aug. 23, 1982
[51] Int. Cl.³ .............................................. F02M 27/02
[52] U.S. Cl. ........................................ 123/3; 123/575; 123/DIG. 12
[58] Field of Search ................ 123/3, 1 A, 557, 525, 123/575, 577

[56] References Cited

U.S. PATENT DOCUMENTS

| | | | |
|---|---|---|---|
| 3,315,479 | 4/1967 | Wiswall et al. | 62/48 |
| 4,046,522 | 9/1977 | Chen et al. | 123/3 |
| 4,086,877 | 5/1978 | Henkel et al. | 123/1 A |
| 4,088,450 | 5/1978 | Kosaka et al. | 123/1 A |
| 4,091,086 | 5/1978 | Hindin et al. | 423/64 ER |
| 4,211,537 | 7/1980 | Teitel | 123/3 |
| 4,216,198 | 8/1980 | Simons | 123/DIG. 12 |
| 4,282,835 | 8/1981 | Peterson et al. | 123/1 A |
| 4,290,267 | 9/1981 | Buchner | 123/3 |
| 4,366,782 | 1/1983 | Jackson et al. | 123/3 |

FOREIGN PATENT DOCUMENTS

| | | | |
|---|---|---|---|
| 3005373 | 10/1981 | Fed. Rep. of Germany | 123/DIG. 12 |
| 56-22876 | 1/1981 | Japan | |

OTHER PUBLICATIONS

Energy, Encyclopedia of, pp. 326-330.
Kikuchi et al., J. Japan Petrol. Inst., 23, 328-333, (1980).

Primary Examiner—William A. Cuchlinski, Jr.
Attorney, Agent, or Firm—Lovercheck; William A. Mikesell, Jr.

[57] ABSTRACT

An apparatus and method for starting an internal combustion engine comprising the sequence of steps as follows:

(a) providing a hydride reactor means, vaporizing means, dissociation reactor means and liquid alcohol said hydride reactor means comprising hydride forming means, (b) vaporizing a portion of said liquid alcohol in said vaporizing means to form alcohol vapor, (c) dissociating said alcohol vapor in said dissociation reactor means to form a first gaseous mixture comprising hydrogen, (d) conveying said first gaseous mixture comprising hydrogen to said hydride reactor means wherein said hydrogen is formed into a hydride, (e) heating said hydride to form a second gaseous mixture comprising hydrogen, (f) conveying said second gaseous mixture comprising hydrogen to said engine, (g) starting said engine.

13 Claims, 7 Drawing Figures

HYDRIDE COLD STARTER IN ALCOHOL FUEL TREATMENT AND DISTRIBUTION APPARATUS AND METHOD

BACKGROUND OF THE INVENTION

Kosaka et al, discloses in U.S. Pat. No. 4,088,450 a plurality of catalysts arranged in a desirable order based on the temperature gradient existing in the reaction chamber. The operation temperature of the catalyst and the temperature of the portion of the reaction chamber it is in, are matched so as to avoid catalytic degradation and/or catalytic inactivity.

Hindin et al in U.S. Pat. No. 4,091,086 discloses a catalytic composition particularly useful in the production of hydrogen from methanol, especially by steam reforming, which comprises a mixture of zinc oxide, copper oxide, thorium oxide and aluminum oxide whereby the activity and activity maintenance of the catalytic composition is superior relative to a composition otherwise substantially the same but lacking thoria.

Henkel et al in U.S. Pat. No. 4,086,877 discloses a fuel gas obtained in a reformed gas generator through the catalytic reaction of hydrocarbons and a gas containing oxygen and provided to an internal combustion engine has its heat content along with that of the exhaust gas of the engine used to convert methanol endothermically into a gas mixture containing carbon monoxide and hydrogen with the gas mixture so formed fed to one or both the reformed gas generator and, along with the fuel gas, the internal combustion engine.

Peterson et al in U.S. Pat. No. 4,282,835 provides for synthesizing CO and $H_2$ fuel from $CH_3OH$ and water in a synthesizer. The methanol is confined in a fuel tank as a liquid. The water is confined in a water tank. A fuel pump and a water pump force fuel and water to a mixing valve. A heat exchanger heats the fuel and water to a gas which passed through Ni or $Al_2O_3$ catalyst at 500° C. where the $CH_3OH$ disassociates to CO and $H_2$. The gas passes to a synthesizer containing Fe or $Al_2O_3$ above 500° C. where $H_2O$ and CO form $H_2$ and $CO_2$. The gas is mixed with air and passed to an engine.

Chen et al in U.S. Pat. No. 4,046,522 provides a preengine converter. The catalyst in the first reactor may be copper zinc chromite. Col. 2, lines 28–35. A second catalyst is a hydrocarbon cracking catalyst such as zeolite.

Kikuchi et al in J. Japan Petrol. Inst., 23, (5), 328–333 (1980) discloses exothermic partial combustion during start-up of a methanol fueled engine. At Table I on page 329 he lists copper oxide/zinc oxide catalyst as well as copper/nickel catalyst for conversion of methanol on various supported copper catalysts. At page 332 Kikuchi discusses methanol conversion to give formaldehyde type intermediate which decomposes to hydrogen and carbon monoxide as shown in the first two equations listed therein.

Wiswall et al in U.S. Pat. No. 3,315,479 disclose a method for storing hydrogen whereby gaseous hydrogen is absorbed by nickel—magnesium alloys at temperatures above 250° C. and pressures above 18 psi.

Energy, Encyclopedia of, pages 326–330 discloses at page 327 that hydrogen may be combined with metals to form loosely bound hydrides, which may then be dissociated at elevated temperature. Attractive hydrides are based on Mg-Ni and Mg-Du alloys. The dissociation temperatures at 1 atmosphere are about 250° C. The dissociation heat may be obtained from the exhaust of a hydrogen fueled engine.

Nissan, European Patent Application, Publication Number 0 022 876 discloses a starter for an alcohol engine having device for reforming into gaseous fuel and a storing device for adsorbing gaseous fuel which may include metal hydride.

SUMMARY OF THE INVENTION

A novel apparatus is provided for a novel method of starting an internal combustion engine said method comprising the sequence of steps as follows:

(a) providing a hydride reactor means, vaporizing means, dissociation reactor means and liquid alcohol said hydride reactor means comprising hydride forming means, (b) vaporizing a portion of said liquid alcohol in said vaporizing means to form alcohol vapor, (c) dissociating said alcohol vapor in said dissociation reactor means to form a first gaseous mixture comprising hydrogen, (d) conveying said first gaseous mixture comprising hydrogen to said hydride reactor means wherein said hydrogen is formed into a hydride, (e) heating said hydride to form a second gaseous mixture comprising hydrogen, (f) conveying said second gaseous mixture comprising hydrogen to said engine, (g) starting said engine.

Beneficially the invention provides for starting internal combustion engines fueled by alcohol.

The invention provides improved starting of automobile engines especially useful at temperatures below 40° F.

A fuel treatment and distribution apparatus in combination with an internal combustion engine comprising
an internal combustion engine,
an alcohol fuel storage means,
an electric current source means,
a dissociator means,
a hydride start-up reactor means, said hydride reactor means comprising hydride forming means and heating means connected to said electric current source means,
said alcohol storage means being in fluid flow communication with said dissociator means,
said dissociator means being in fluid flow communication with said hydride start-up reactor means, and said engine,
said hydride start-up reactor means being in fluid flow communication with said internal combustion engine,
whereby alcohol dissociated to hydrogen in said dissociator means, being formed into hydride in said hydride start-up reactor means and said hydride being later formed into hydrogen which passes to the engine for start-up.

By storing hydrogen for start-up as hydride there is no need for high pressure hydrogen storage. Additional hydrogen bound in the hydride form is safe from explosion. When hydrogen for start-up is required the hydride, which may be stored at atmospheric pressure, is heated releasing hydrogen. This hydrogen is mixed with oxygen and combusted in the engine for start-up.

BRIEF DISCUSSION OF THE DRAWING

DETAILED DISCUSSION OF THE INVENTION

Figure 1:
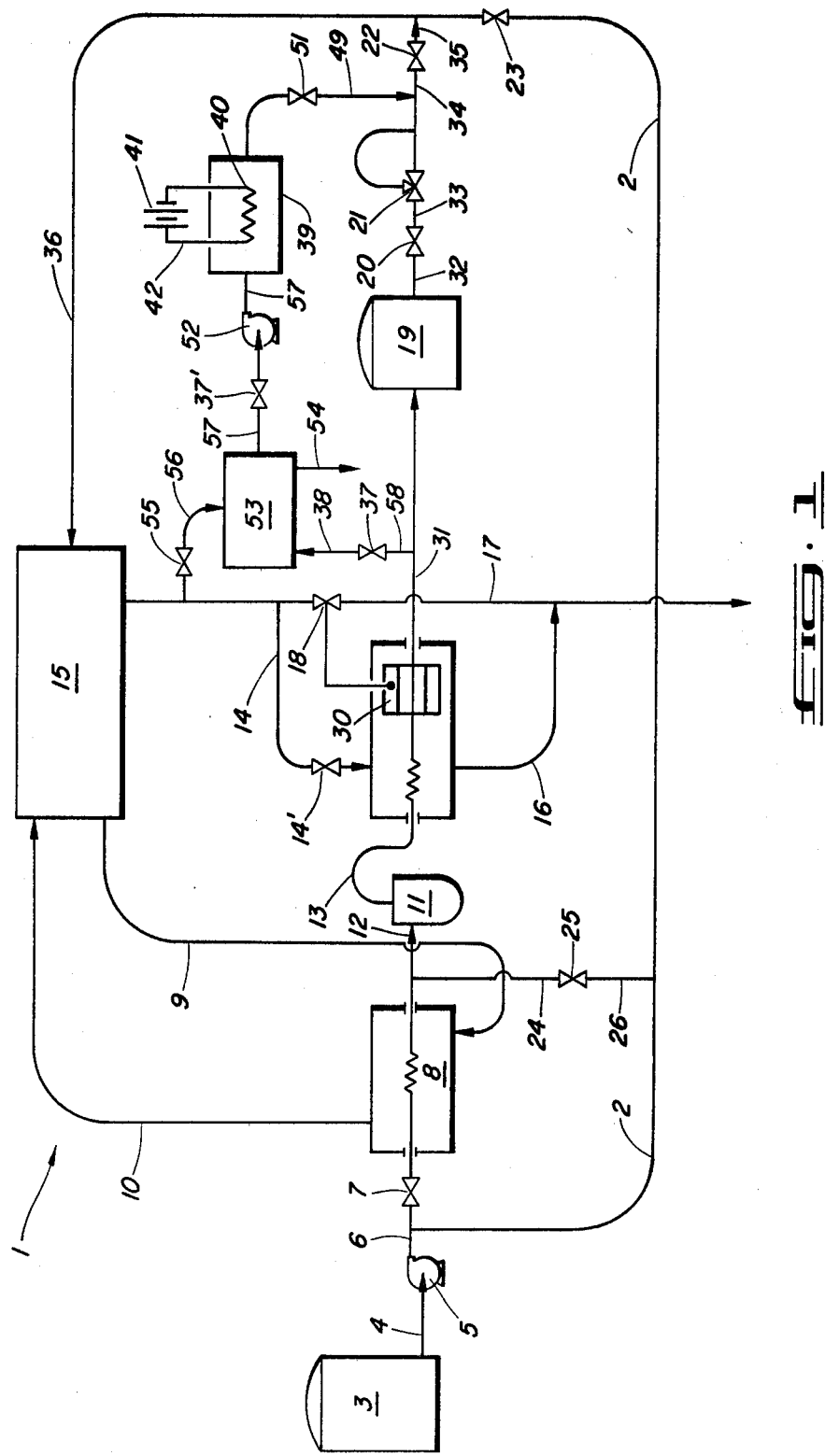
FIG. 1 is a schematic representation of a method and apparatus in accordance with the present invention wherein hydrogen is compressed for hydride formation.

The invention relates to a fuel treatment and distribution apparatus and method as shown in the drawings.

The present invention provides an improved cold starting method and apparatus. Alcohol fueled automobiles have difficulty starting at low temperatures for example where the ambient temperature is below freezing as the vapor pressure of alcohol is low which causes difficulty during start-up of an alcohol fueled engine on alcohol vapor. The method and apparatus of the present invention provide for formation of hydride from hydrogen formed by dissociation of alcohol for storage and formation of hydrogen from the stored hydride for cold starting. The car can be cold started with hydrogen along or a mixture of hydrogen and alcohol. After the car is started the hydride reactor is isolated from the remainder of the system by closing control valves and all of the fuel may be fed to the engine through an operational dissociation reactor which preferably is provided with a catalyst for the formation of hydrogen and carbon monoxide. Alternatively the alcohol vapor, atomized alcohol, hydrogen alone or mixtures thereof are fed to the engine.

Where methanol is the fuel in storage tank 3, the reaction

$$CH_3OH \rightarrow CO + 2H_2 \qquad (I)$$

takes place in reactor 30. In the engine 15, CO and $H_2$ from line 36 are mixed with $O_2$ for example in a carburetor with an air intake opening, and combusted by the reaction

$$CO + H_2 + O_2 \rightarrow CO_2 + H_2O \qquad (II)$$

As shown in the FIG. 1, a fuel system is generally shown at 1. The fuel system 1 has a catalyst containing reactor 30 and a by-pass conduit 2. Liquid alcohol is stored in the liquid alcohol storage tank 3. From liquid alcohol storage tank 3 the liquid alcohol is conveyed in liquid alcohol conduit 4 by pump 5 to vaporizer feed line 6 and by-pass conduit 2. Liquid alcohol passes from vaporizer feedline 6 through solenoid valve 7 and into the vaporizer 8. The vaporizer 8 is heated by engine coolant which enters vaporizer 8 through vaporizer heat transfer feedline 9. From the vaporizer the engine coolant returns to the engine through vaporizer heat transfer fluid output line 10. The vaporized alcohol is conveyed from the vaporizer 8 to the liquid trap 11 by line 12 and from the liquid trap 11 through line 13 to the catalyst containing reactor 30. The catalyst containing reactor 30 operates at about 600° F. The vaporized alcohol is dissociated into hydrogen and carbon monoxide in the catalyst containing reactor 30. A preferred catalyst for dissociation in the catalyst bed of the catalyst containing reactor 30 is a copper/zinc catalyst with or without promoters such as chromium. However, the dissociator may be provided with a dual catalyst bed; one catalyst being a low temperature dissociation catalyst and the other catalyst being a high temperature dissociation catalyst. Useful as a low temperature (200°–300° C.) catalyst is a copper/zinc catalyst with or without promoters. Useful as a high temperature (300°–400° C.) catalyst is a zinc/chromium catalyst. The advantage of having a dual catalyst bed is that the low temperature catalyst is protected from deactivation by thermal sintering because the dissociation reaction in the high temperature catalyst zone reduces the operating temperature of the low temperature catalyst bed. Thus, the vaporized alcohol first contacts the high temperature catalyst and then contacts the low temperature catalyst as it passes through the catalyst containing reactor 30.

The dissociation catalyst bed may be low temperature catalyst along for example a copper/zinc catalyst as previously mentioned.

The catalyst containing reactor 30 and the superheater shown in the drawing are heated by exhaust from the internal combustion engine 15. Exhaust from the internal combustion engine 15 is conveyed by conduit 14 having solenoid valve 14' to the catalyst containing reactor 30. The engine exhaust leaves the catalyst containing reactor 30 through the conduit 16. This cooled engine exhaust may be recycled to the engine or exhausted to the atmosphere or partially recycled and partly exhausted to the atmosphere. The superheater 43 after line 13 and before reactor 30 heats the fuel which is heated to about 200° F. in a vaporizer 8 and superheated to about 600° F. in the superheater 43.

An exhaust flow valve 18 is provided with temperature control, to control the temperature of the catalyst containing reactor 30. Engine exhaust from the engine 15 may be by-passed around the catalyst containing reactor 30 through the exhaust flow valve 18 and into the exhaust flow conduit 17. By controlling the amount of exhaust used to heat the catalyst containing reactor 30 the temperature of the catalyst containing reactor may be regulated. The exhaust flow valve 18 is connected to a temperature sensor on the reactor 30.

Hydrogen containing gas from the catalyst containing reactor 30 passes through conduit 31 into storage tank 19. Storage tank 19 provides gas for use during startup and surge conditions such as acceleration. From the storage tank 19 gas travels through conduit 32 to the solenoid valve 20. From the solenoid valve 20 gas travels through line 33 to the pressure control valve 21. From the pressure control valve 21 the dissociated alcohol travels through line 34 to the dissociated gas control mechanism 22. From the dissociated gas control mechanism 22, the gas travels through line 35 to fuel feed conduit 36 into engine 15. The dissociated gas control mechanism 22 and the fuel flow mechanism 23 may for example be that of an automobile fuel injection system or an automobile carburetor.

Alcohol from by-pass conduit 2 also passes into fuel feed conduit 36. By-pass conduit 2 is provided with fuel flow mechanism 23. Fuel flow mechanism 23 controls the amount of alcohol to be fed into the internal combustion engine 15 via fuel feed conduit 36.

The preferred alcohol for use in the fuel system is methanol. Among the advantages of the bypass conduit system is that more fuel material may be passed into the internal combustion engine 15 during periods of peak operation, such as in the case where quantities of fuel in excess of those of normal operation are needed for example during startup and acceleration.

The line 24 connects evaporator 8 to valve 25. Line 26 connects valve 25 to line 2. Valve 25 and the valve 50 in line 2 control the proportion of liquid and vapor feed through line 2. Thus, evaporated methanol may be fed to line 2 to provide a mixed feed of vaporized methanol and liquid methanol to engine 15 via line 36.

Because of the capacity of the acceleration loop, the dissociation reactor need only be large enough to handle normal operation conditions. Periods of peak operation can be handled by the capacity of the acceleration loop.

With more particular reference to FIG. 1, the startup is carried out as follows.

Hydrogen passes through line 58 through valve 37 and into line 38. Hydrogen passes from line 38 into the optional $CO_2$ absorbent chamber 53. The $CO_2$ absorbent chamber 53 contains a solid absorbent for the absorption of $CO_2$. The chamber 53 is connected to the line 17' by the line 56. Valve 55 is provided in line 56. To regenerate the absorbent hot exhaust gases are passed through line 56 into the absorbent chamber 53. From the absorbent chamber 53 the gases pass through the line 54 to be exhausted. This regeneration process is carried out with the valves 37 and 37' closed. The removal of carbon dioxide from the hydrogen containing gaseous mixture from the dissociation catalytic reactor 30 is optional. The removal of the carbon dioxide improves the rate of hydride formation in the hydride reactor 39. The hydrogen containing gaseous mixture passes from the absorbent chamber 53 through valve 37' to compressor 52. The compressed gas in compressor 52 passes through line 57 to the hydride forming reactor 39. Preferred hydride forming material in the reactor 39 includes magnesium nickel alloy and magnesium copper alloy. The magnesium nickel alloy forms a hydride with hydrogen at 120 psia and 300° C. For hydrides forming at normal operating pressures or for dissociation systems wherein hydrogen is available at the needed pressures for hydride formation in the hydride reactor 39 the compressor 52 is not needed.

The valve 51 is closed while the valve 37 and 37' are open and the hydride is being formed in the hydride reactor 39. During start-up, the valve 37 is closed and the valve 51 is opened. Electrical current passes from the battery 41 through line 42 to the electrical resistance heating element 41. The temperature in the hydride reactor 39 is raised causing the release of hydrogen from the hydride in the reactor 39. The hydrogen passing from the hydride reactor 39 passes through valve 51 and line 49 into line 34. The valve 20 and 23 are closed. The valve 22 is open. Thus the hydrogen from the hydride reactor passes through line 34 valve 22 and line 36 into the engine 15. The engine 15 is started using this hydrogen formed from the hydride.

The hydride formed from hydrogen used to cold start the engine may be used along or mixed with atomized alcohol. Such atomized alcohol is fed through by-pass conduit 2 and mixed with the hydrogen in line 36.

Figure 2:
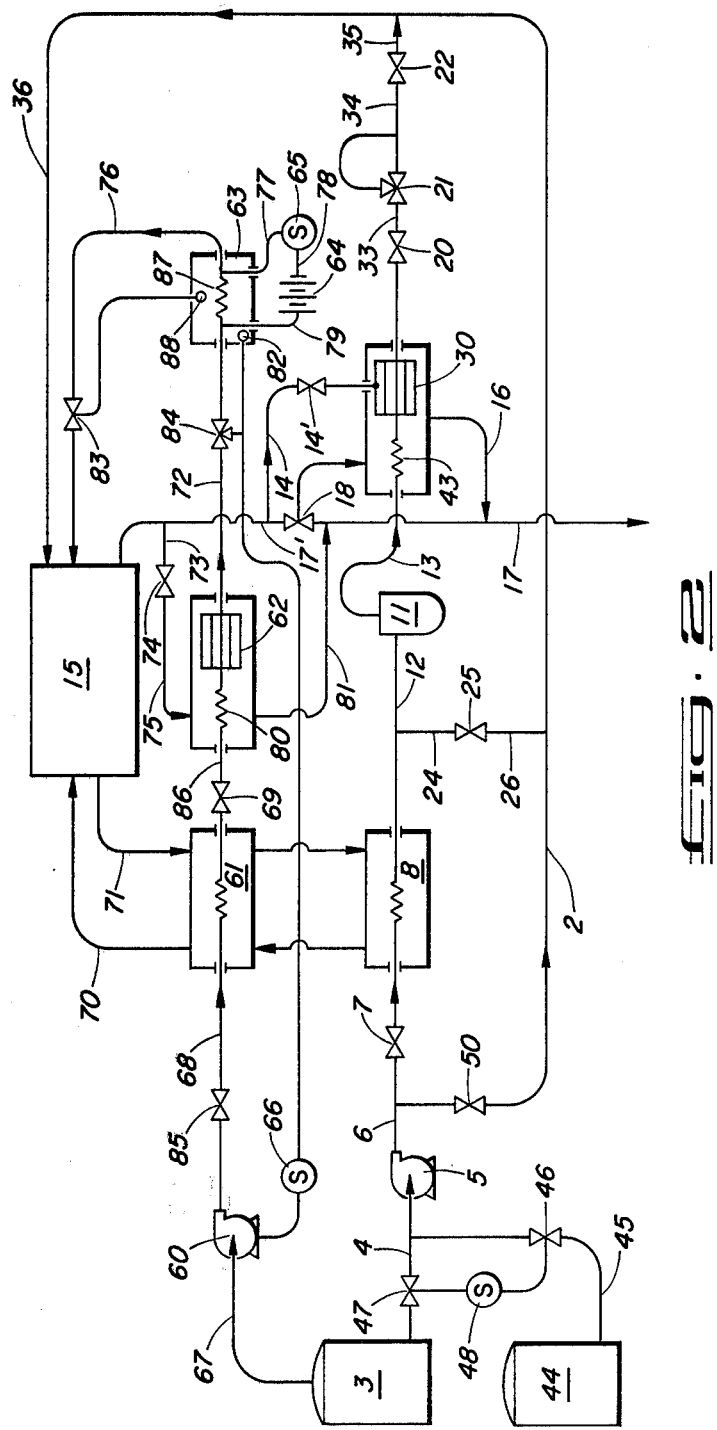
FIG. 2 is a schematic representation of a method and apparatus in accordance with the present invention wherein hydrogen for hydride formation is formed at above ambient pressures.

With more particular reference to FIG. 2. Line 67 connects alcohol fuel tank 3 to the pump 60. The pump 60 pumps fuel through valve 85 in line 68 to the vaporizer 61. The fuel is vaporized in the vaporizer 61 by heat from the cooling system of the engine 15 passing through line 71 through vaporizer 61 and returning through line 70 to the engine 15. Vaporized methanol maintained at an elevated pressure within the vaporizer 61 by valve 69 in line 86. The alcohol vapor passes through line 86 into the dissociation of reactor 62 after passing through superheater 80. Superheater 80 is heated by exhaust from the engine 15 which passes through line 17' through line 73. The exhaust passes through open valve 74 through line 75 into the superheater 80. Cooled exhaust passes through line 81 from the superheater 80 into exhaust line 17. The alcohol dissociates into hydrogen in the dissociation reactor 62. The hydrogen gas passes through line 72 from the dissociation reactor 62. The hydrogen passes through open valve 84 in line 72 into the hydride reactor 63. The valve 83 in line 76 leading from the hydride reactor is closed. At a predetermined pressure, the pressure sensor 82 signals the control switch 66 which closes the valve 84 and turns off the pump 60. The control switch 66 may also signal valve 74 to close so that exhaust bypasses the superheater 80.

With the valves 84 and 83 closed, the pressure within the hydride reactor 63 drops as hydrogen forms hydride from the alloy contained with the hydride reactor. The formation of the hydride serves to store the hydrogen in a form which may be stored at comparatively low pressure and made available at low temperatures for reuse. When the engine 15 is turned off, the switch 65 may be turned on providing electrical current from the battery 64 through line 78 through the switch 65 into line 77 which provides electrical power to the electrical resistance heating element 87. The circuit is completed by line 79 which connects the electrical resistance heating element 87 to the battery 64. The heating element raises the temperature within the hydride reactor causing the hydride to form hydrogen. At a predetermined pressure the pressure sensor 88 signals the valve 83 to open and hydrogen from the hydride reactor 63 passes through line 76 and valve 83 into the engine. The hydrogen is mixed with oxygen and the engine is started.

Figure 3:
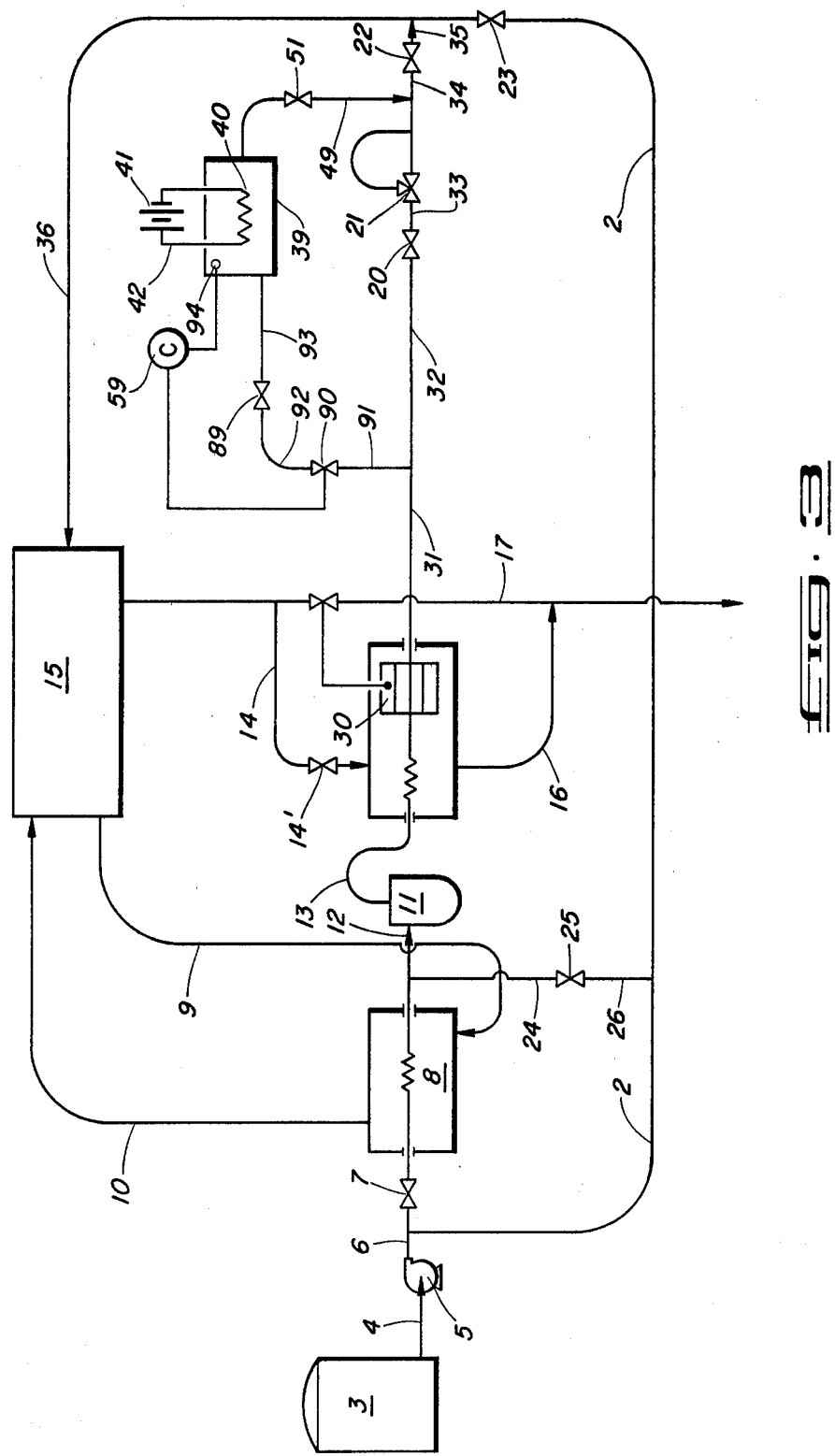
FIG. 3 is a schematic representation of a method and apparatus in accordance with the present invention wherein hydrogen for both hydride formation and immediate combustion as fuel is formed at above ambient pressures.

With more particular reference to FIG. 3, it is seen that valve 89 is connected to the hydride reactor 39 by line 93. Valve 89 is connected to valve 90 by line 92 and valve 90 is connected to line 31 by line 91. Valve 89 allows flow in only one direction. And only at pressures in excess of a predetermined pressure. Thus valve 89 is a directional valve which opens only at pressures above a predetermined minimum pressure. Valve 90 must be open to allow flow between line 31 and a valve 89.

Valves 90 and 51 are then closed. The hydride reactor cooled. Vent valve 94 is opened at a predetermined temperature by controller 59 so that $CO_2$ and CO are vented. Controller 59 is connected to a temperature sensor (not shown) on hydride reactor 39. Valve 94 is then closed. The hydride reactor is isolated, cooled and at reduced partial pressures of $CO_2$ and CO. The hydride reactor may then be test heated to determine the amount of hydride present. The amount of hydride present is directly related to the hydrogen pressure produced (by that amount of hydride) at a given temperature within a constant volume. If the pressure produced exceeds the set point test pressure required for start-up then system is allowed to cool. The hydride forms and is stored for start-up.

When less than the set-point pressure is obtained on test heating then controller 59 opens valve 90 allowing additional hydrogen to enter the hydride reactor 39 through minimum pressure unidirectional valve 89.

During start-up the valves 7, 14', 20 and 23 are in a closed position. Hydride reactor 39 has heating element 40. The battery 41 passes current through line 42 and electrical resistance heating element 40. The hydride in the reactor 39 forms hydrogen which is fed through lines 49, 34, 35 and 36 (valves 51 and 22 being open) to the engine for startup.

In another embodiment of the invention, the tank 3 may contain gasoline or alternatively, the tank 3 may contain an alcohol fuel and an additional tank contains an alternative fuel such as gasoline, this additional tank is in fluid flow communication with line 2 for example by being connected to line 4. When operating on gasoline the valves 7, 14' and 20 are closed and the gasoline is fed through the line 2 through the fuel flow mechanism 23 to the engine 15.

When the engine is turned off the valves 7, 14', 20 and 38 are closed. In closing these valves dissociated gas is trapped in the storage tank 19. This stored hydrogen optionally is forced from tank 19 through open valves 20 into engine 15 to supplement the hydrogen formed in reactor 39.

In an embodiment of the invention using more than one fuel tank, a selector switch 48 which provides for the selection of which fuel is to be used is provided by control of the feed valves from the storage tank for each fuel. In this embodiment of the invention, the valve 47 is in line 4 between the pump 5 and the storage tank 3. Additionally, the additional storage tank 44 is connected to the line 4 by line 45. The valve 46 is in the line 45 connecting the additional storage tank 44 to line 4. The valve 47 is in the line 4 between the storage tank 3 and the line 45 connecting line 4 with the additional storage tank 44. The selector switch 48 controls the valves 46 and 47 to proportion each fuel used or to select which fuel is used alone. The additional tank 44 preferably contains gasoline.

The hydride reactor 139, which corresponds to the reactors 39 and 62, in FIGS. 1–3, may be a readily replaceable container with or without an electrical resistance heating element therein.

Figure 4:
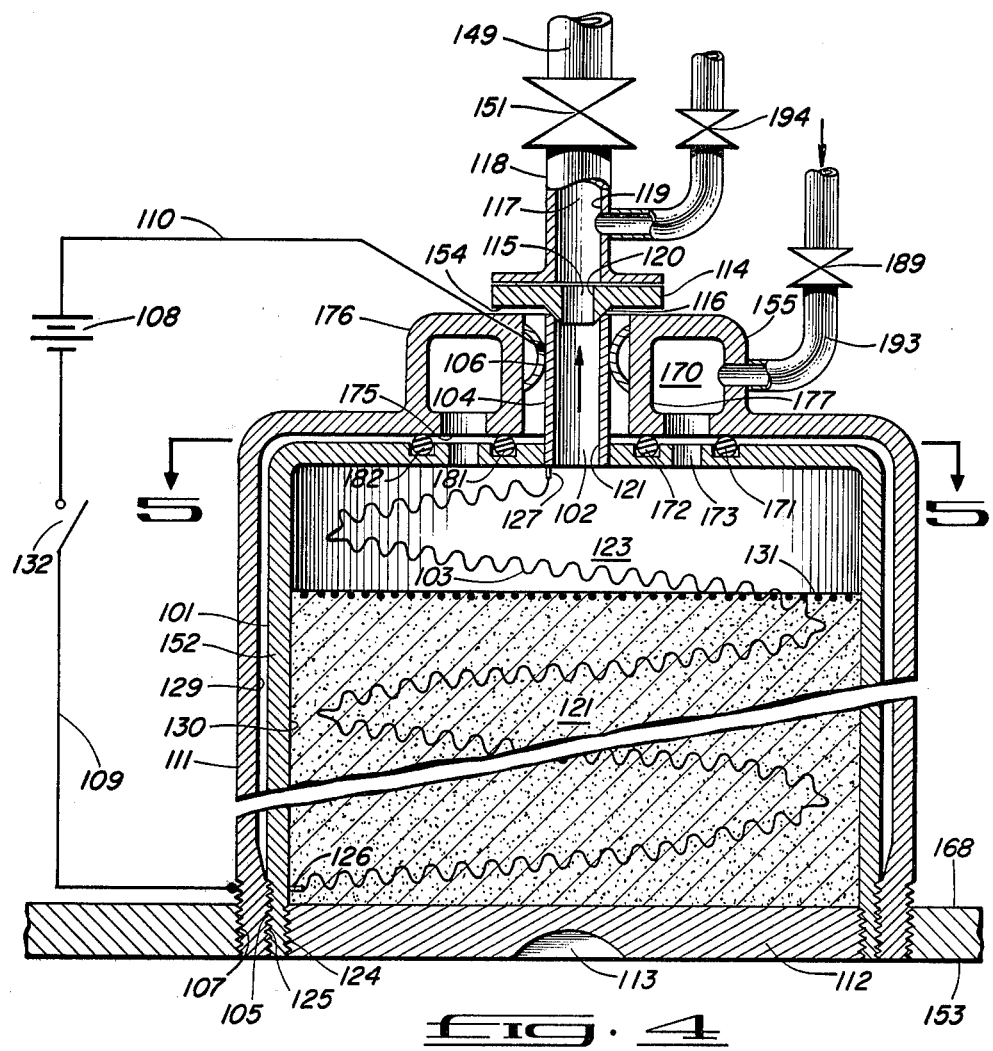
FIG. 4 is a cross sectional view of a hydride container with electrical heating element for use in the method and apparatus of the invention.

With more particular reference to the drawing, FIG. 4 shows a hydride container in accordance with the present invention. The hydride container 101 has inner surface of the hydride container wall 130. The inner surface 130 encloses the hydrogen chamber 123 and the hydride 121. The container 101 has container outlet passage 102 defined by the inner surface 121 of cylindrical hydride container electrical contact 104. The cylindrical hydride container electrical contact 104 is connected by cylindrical contact connector 127 to the electrical resistance heating element 103. The electrical resistance heating element 103 is connected to the threaded contact connector 126. The threaded contact connector 126 is connected to the container outer threads 125. Cylindrical hydride container electrical contact 104 is electrically insulated from the hydride container wall 152 by insulation (not shown) therebetween. Cylindrical receptacle electrical contact 106 is electrically insulated from the receptacle distributor housing 176 by insulation (not shown) therebetween. Threaded contact connector 126 is electrically insulated from hydride container wall 152 by insulation (not shown) therebetween. The threaded contact connector 126 passes through the hydride container wall 152 and is electrically connected to an electrically conducting inner metal film threaded contact formed to and electrically insulated from container outer threads 125.

Similarly, line 109 extends through and is electrically insulated from receptacle wall 111. The line 109 is electrically connected to an electrically conducting outer metal film threaded contact formed to and electrically insulated from receptacle inner threads 105. The line 9 is connected to battery 108. The line 109 has switch 132 therein. The battery 108 is connected by line 110 to the cylindrical receptacle electrical contact 106. As shown in FIG. 4 the cylindrical electrical contact 106 is positioned to engage the cylindrical hydride container electrical contact 104 for the transfer of electrical current therebetween. Thus, when the switch 132 is closed, current flows from the battery 108 through line 110, the cylindrical support electrical contact 106 into the cylindrical hydride container electrical contact 104. The current flow continues from the cylindrical hydride container electrical contact 104 through the electrical resistance heating element 103, threaded contact connector 126, and the inner and outer metal film threaded contacts before returning to the battery through line 109. Thus, the battery 108 provides a source of electrical current for heating the electrical resistance heating element 103 when the switch 132 is closed and the hydride container 101 is in the operable position shown in cross section in FIG. 4.

By heating the hydride in the hydride container, hydrogen is produced. The hydrogen collects in the hydrogen chamber 123 and passes from the hydrogen chamber 123 through the container outlet passageway 102. From the container outlet passageway 102 the hydrogen passes through the plug passage 115 of resilient plug 114. From the plug passage 115 the hydrogen passes through the distribution passageway 117 in the hydrogen distribution channel 118. The distribution passage 117 is defined by the distribution channel inner surface 119. The hydrogen distribution channel 118 engages sealingly the upper surface of plug 114. The plug flange lower surface 154 sealingly engage the upper surface of the cylindrical receptacle contact housing 155 the plug passageway 115 is defined by the plug inner wall surface 120. The beveled plug surface 116 sealingly engages the cylindrical contact inner surface 121 at its upper end. The cylindrical hydride container electrical contact 104 fits within the volume defined by the inner surface 128 of the cylindrical receptacle electrical contact 106. The hydride container 101 is positioned for operation within the volume defined by the receptacle wall inner surface 129. The hydride container is provided with a screen support 131 to support the hydride therein. The receptacle inner threads 105 serve to support the hydride container 101 within the receptacle wall 111 by engaging the container outer threads 125.

The hydride container wall 152 has inner surface 130. At the lower end of inner surface 130, container outer threads 125 are provided. The container outer threads 125 supportively and sealingly engage the hydride closure threads 124 of hydride container closure 112. The hydride closure 112 is provided with slot 113 for the insertion of a tool to rotate the hydride container closure 112. By rotating the closure 112 the closure may be removed from the container when the container is removed from the automobile (for example by rotating the closure in the opposite direction, where threads 125 are threaded in the opposite direction from the threads 124) for the purpose of regenerating or replacing unregenerable products of hydrogen formation from hydride. The outer receptacle threads 107 of receptacle wall 111 are supported by the automobile body 168. The automobile body 168 has automobile outer surface 153.

FIG. 4 shows a receptacle distributor housing 176 having an inner wall surface 177. The inner wall surface 177 encloses and defines the chamber 170. The bottom surface 175 of the inner wall of the distributor engages the sealing gasket 172. The outer wall of the distributor 176 engages sealingly the gasket 171. Gas passes from the alcohol dissociation reactor through valve 189 in line 193 to the distributor chamber 170. The hydrogen rich gas passes through apertures 173 into the hydrogen chamber 123. During this regeneration period the valve 151 in line 149 is closed. The valve 194 is also closed. After charging the valve 189 is closed and hydride is allowed to form from the alloy in the hydride bed 121. Nonreactive and inert gases are vented through valve 194 after the hydrogen has formed hydride.

During start-up the valve 151 is opened and the electrical resistance heating element 103 is heated with electrical current passing therethrough from the battery 108. This heats the hydride 121 causing it to produce hydrogen which passes through passageway 102 and line 149 to the internal combustion engine. By mixing this hydride produced hydrogen with oxygen a combustible start-up mixture is formed.

The invention operates by the insertion of the hydride container into the receptacle wall 111 with the completion of the electrical connection to the battery 108. Followed by heating of the hydride to produce hydrogen for the start-up of the internal combustion of the automobile. The heating of the hydride produces hydrogen and products of hydrogen formation from hydride. Preferably the amount of hydride forming alloy in the hydride container is sufficient for at least ten start-ups of the internal combustion engine. Typically from about 0.2 to 1.0 pounds of hydride of magnesium nickel alloy is sufficient to start most common automobile internal combustion engines on a cold day with several unsuccessful attempts.

Preferred hydrides for use as the hydrogen producing material contained within the container 101 are hydrides of magnesium nickel alloy ($Mg_2Ni$) and magnesium copper alloy ($Mg_2Cu$). Thus, production of hydrogen from hydrides of magnesium nickel alloy would produce hydrogen and magnesium nickel alloy. The magnesium nickel alloy is available for regeneration.

Figure 6:
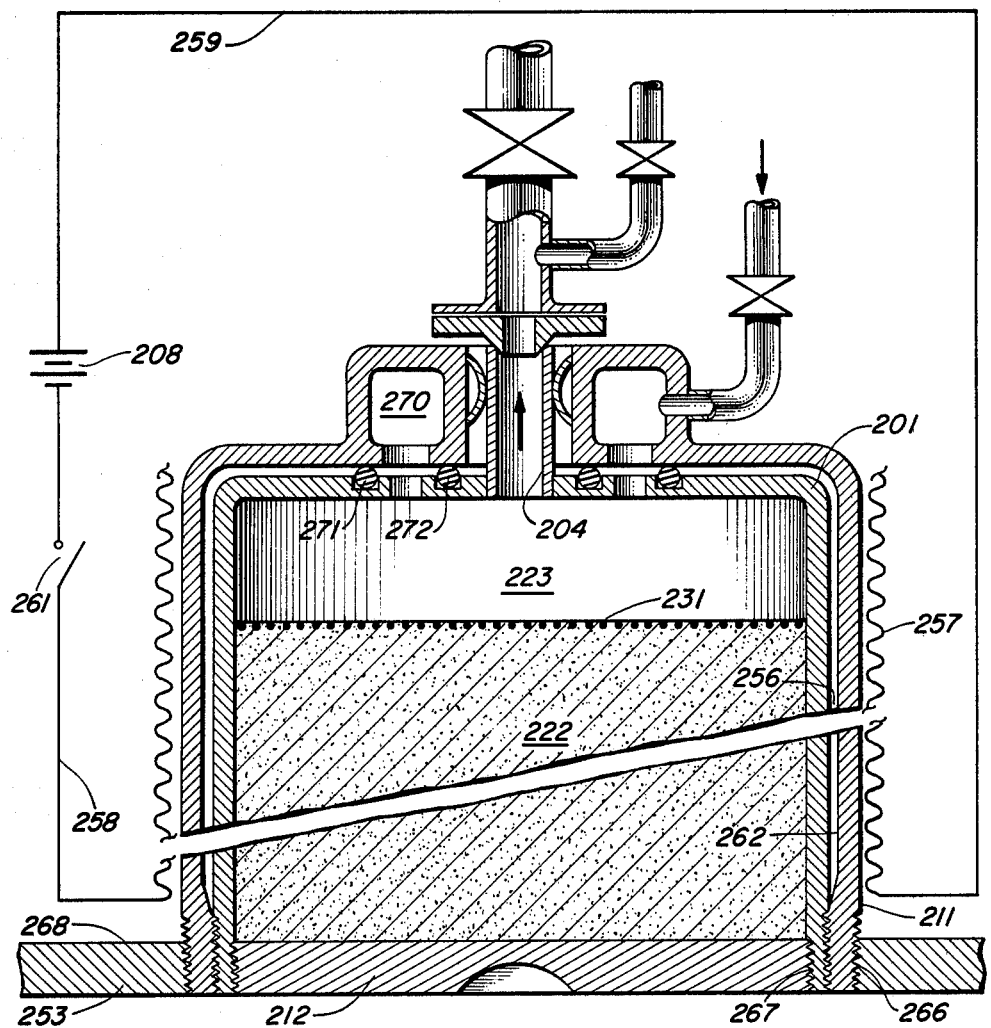
FIG. 6 is a cross sectional view of a hydride container with external electrical heating element for use in the method and apparatus of the invention.
Figure 7:
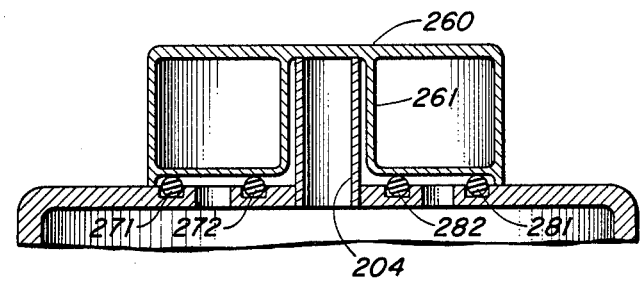
FIG. 7 is a cross sectional view of a container cap.

With more particular reference to FIG. 6, an alternative preferred embodiment is shown wherein the electrical resistance heating element 257 is external to the hydride container 201. The hydride container 201 contains hydride 222 and screen 231. The hydrogen chamber 223 is provided above the screen 231. During transport and storage prior to insertion into the automobile the hydride container 201 is preferably provided with a hydride container cap 260 as shown in FIG. 7. The hydride container 201 is shown with hydride container closure 212 and closure supportive threads 267. The closure supportive threads 267 do not provide electrical contact. The closure supportive threads 267 engage the contain inner threads to support the closure by the container 201. The receptacle chamber 256 is defined by the receptacle wall inner surface 262. The automobile has automobile body outer surface 253. The automobile body 268 supports the receptacle wall 211 by receptacle outer threads 266. The battery 208 provides electric current through line 258 when the switch 261 is closed. Thus, current flows from the battery 208 through the electrical resistance heating element 257 to heat the hydride 222 for the formation of hydrogen therefrom. The current returns through line 259 to the battery 208. The hydride container cap 260 is removed prior to insertion into the receptacle. The receptacle 211 is provided with a plug and a distribution passage as shown in FIG. 4.

As shown in FIG. 7 cap 260 has a central channel wall 261 which encloses the cylindrical hydride container electrical contact 204. The cylindrical member 204 need not be an electrical contact as in the embodiment shown in FIG. 6 and the cap 260 may be used as shown in FIG. 2 for either of the embodiments of FIGS. 4 or 6.

Figure 5:
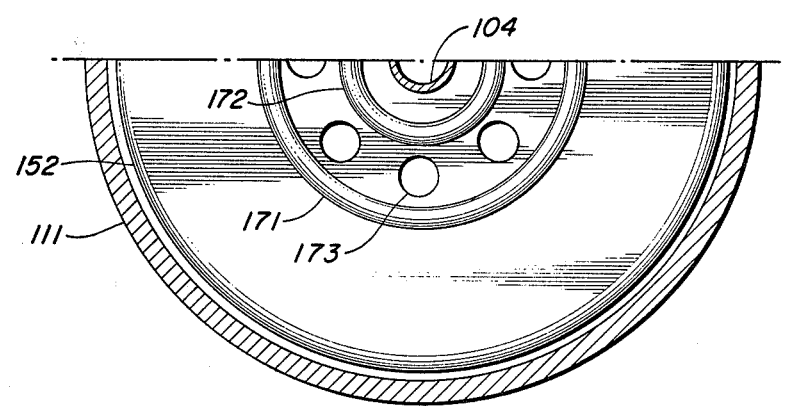
FIG. 5 is a top view along line 5—5 in FIG. 4.

FIG. 5 shows outer gasket 171 and inner gasket 172.

FIGS. 6 and 7 show corresponding gaskets 271 and 272. Gaskets 171, 172, 271 and 272 are each of annular shape and circular cross-section. These gaskets serve to seal the container feed chambers 170 and 270 respectively to hydrogen chambers 123 and 223 respectively.

The inner gaskets 172 and 272 are seated in grooves 181 and 281 respectively. The outer gaskets 171 and 272 are seated in grooves 182 and 282 respectively.

Each of the lines 93, 72 and 57 may be provided with heat exchange means to cool the hydrogen-rich gas mixture passing therethrough. Such heat exchange may be simply fins external to the conduits for heat exchange with the air of the atmosphere. In such case a fan may be provided to increase the air flow rate.

Alternatively the heat exchange means may be a shell and tube heat exchanger for example where the cooling medium is liquid fuel or aqueous engine coolant.

EXAMPLE 1

Methanol is pumped into a vaporizer and vaporized. The pressure of the methanol vapor is maintained at 130 psia by an outlet valve to the vaporizer. The methanol vapor passes through the valve into a dissociation reactor operated at 400° C. and 125 psia. The dissociation reactor contains copper/zinc catalyst which the methanol vapor contacts. The methanol within the dissociation reactor dissociates into a gaseous mixture of $H_2$ and CO. This gaseous mixture of hydrogen passed into a hydride reactor containing an alloy with a starting composition of 45 wt. percent Mg, 55 wt. percent Ni ($Mg_2Ni$). The pressure in the hydride reactor is allowed to raise to 125 psia. Then valves on both the input and output lines of the hydride reactor are closed allowing hydride to form. The pump is turned off. The vaporizer dissociation reactor and hydride reactor are allowed to cool to ambient temperature of 0° C. After 10 hours the hydride reactor pressure is 30 psia. The hydride bed of the hydride reactor is heated to 300° C. by electric resistance heating form hydrogen from the hydride. The hydride reactor output valve is then opened. As the hydrogen passes to the engine it is mixed with oxygen and the engine is started.

EXAMPLE 2

Methanol is pumped into a vaporizer and vaporized. The pressure of the methanol vapor is maintained at 130 psia by an outlet valve to the vaporizer. The methanol vapor passes through the valve into a dissociation reactor operated at 400° C. and 125 psia. The dissociation reactor contains dual catalyst of alumina followed by copper/zinc catalyst which the methanol vapor contacts. A portion of the methanol within the dissociation reactor dehydrates to ether and water another portion dissociates into $H_2$ and CO. The water and carbon monoxide react to form $H_2$ and $CO_2$. This gaseous mixture of hydrogen passed into a hydride reactor containing an alloy with a starting composition of 45 wt. percent Mg, 55 wt. percent Ni ($Mg_2Ni$). The pressure in the hydride reactor is allowed to raise to 125 psia. Then valves on both the input and output lines of the hydride reactor are closed allowing hydride to form. The pump is turned off. The vaporizer dissociation reactor and hydride reactor are allowed to cool to ambient temperature of 0° C. After 10 hours the hydride reactor pressure is 32 psia. The hydride bed of the hydride reactor is heated to 250° C. by electric resistance heating form hydrogen from the hydride. The hydride reactor output valve is then opened. As the hydrogen and either pass to the engine they are mixed with oxygen and the engine is started.

EXAMPLE 3

Methanol is pumped into a vaporizer and vaporized. The pressure of the methanol vapor is maintained at 130 psia by an outlet valve to the vaporizer. The methanol vapor passes through the valve into a dissociation reactor operated at 400° C. and 125 psia. The dissociation reactor contains copper/zinc catalyst which the methanol vapor contacts. The methanol within the dissociation reactor dissociates into a gaseous mixture of $H_2$ and CO. This gaseous mixture of hydrogen passed into a hydride reactor containing an alloy with a starting composition of 45 wt. percent Mg, 55 wt. percent Ni ($Mg_2Ni$). The pressure in the hydride reactor is allowed to raise to 125 psia. Then valves on both the input and output lines of the hydride reactor are closed allowing hydride to form. The pump is turned off. The vaporizer dissociation reactor and hydride reactor are allowed to cool to ambient temperature of 0° C. When the hydride reactor pressure is 30 psia the hydride reactor output valve is opened to the engine to reduce the hydride reactor pressure then the valve is closed. After 6 hours the hydride bed of the hydride reactor is heated to 300° C. by electric resistance heating form hydrogen from the hydride. The hydride reactor output valve is then opened. As the hydrogen passes to the engine it is mixed with oxygen and the engine is started.

While the invention has been described above with respect to certain of its preferred embodiments, it is respectfully pointed out that many variations and modifications are possible within the scope of the present invention and it is anticipated that many such variations and modifications may appear obvious or desirable to those skilled in the art based upon a review of the foregoing description of preferred embodiments.

What is claimed is:

1. A fuel treatment and distribution apparatus in combination with an internal combustion engine comprising
    an internal combustion engine,
    an alcohol storage means,
    an electric current source means,
    a dissociator means,
    a hydride start-up reactor means, said hydride reactor means comprising hydride forming means and heating means connected to said electric current source means,
    said alcohol storage means being connected by dissociator input conduit means in fluid flow communication with said dissociator means,
    said dissociator means being connected by dissociator output conduit means in fluid flow communication with said internal combustion engine,
    said dissociator output conduit means being connected by hydride reactor input conduit means in fluid flow communication with said hydride start-up reactor means,
    said hydride start-up reactor means being connected by hydride reactor output conduit means in fluid flow communication with said internal combustion engine,
    said hydride reactor input conduit means being provided with valve means,
    whereby alcohol dissociated to hydrogen in said dissociator means, being formed into hydride in said hydride start-up reactor means and said hydride being formed into hydrogen which passes to the engine for start-up.
2. The apparatus of claim 1 wherein said dissociator means further comprises waste heat recovery heat exchange means.
3. The apparatus of claim 1 wherein said electric current source means is a battery.
4. A method of starting an internal combustion engine comprising the sequence of steps as follows:
    (a) providing a hydride formation reactor means, vaporization means, alcohol dissociation reactor means and liquid alcohol,
    said hydride formation reactor means comprising hydride forming means,
    (b) operating said engine by combustion therein an operational gaseous mixture formed by:
        (i) vaporizing a portion of said liquid alcohol in said vaporization means to form alcohol vapor,
        (ii) dissociating said alcohol vapor in said dissociation reactor means to form said operational gaseous mixture, said operational gaseous mixture comprising hydrogen, and
        (iii) contacting said hydride forming means with a portion of said operational gaseous mixture in said hydride reactor means whereby said hydrogen is formed into a hydride,
    (c) stopping the operation of said engine,
    (d) heating said hydride to form a start-up gaseous mixture comprising hydrogen,
    (e) conveying said start-up gaseous mixture comprising hydrogen to said engine,
    (f) starting said engine by combustion of said start-up gaseous mixture.
5. The method of claim 4 wherein said hydride forming means comprises magnesium, nickel or copper.
6. The method of claim 4 wherein said hydride forming means comprises Mg-Ni alloy or Mg-Cu alloy.
7. The method of claim 6 further comprising mixing said portion of said operational gaseous mixture with atomized alcohol and air to form said start-up gaseous mixture.
8. The method of claim 4 wherein said first gaseous mixture passes through a minimum pressure valve to proir to contacting said hydride forming means.
9. The method of claim 4 wherein said first gaseous mixture passes through a carbon dioxide absorbent chamber means prior to contacting said hydride forming means.
10. The method of claim 4 further comprising (g) operating said engine by combustion therein of a subsequent operational gaseous mixture formed by
  (i) vaporizing a portion of said liquid alcohol in said vaporization means to form alcohol vapor, and
  (ii) dissociating said alcohol vapor in said diisociation reactor means to form said subsequent operational gaseous, said subsequent operational gaseous mixture comprising hydrogen.

11. The method of claim 4 further comprising in step (b) (iii) venting said hydride reactor means to the atmosphere.

12. In a method of fuel treatment and start-up of an automobile using dissociated alcohol from a liquid fuel storage container for operating an internal combustion engine the improvement comprising forming hydride in a hydride reactor means from said dissociated alcohol during the operation of said internal combustion engine for subsequent production of start-up hydrogen, stopping the operation of said internal combustion engine, producing start-up hydrogen from said hydride in said hydride reactor means by heating said hydride, starting said internal combustion engine by combusting said hydrogen.

13. The method of claim 12 further comprising venting said hydride reactor means to the atmosphere.

* * * * *

UNITED STATES PATENT OFFICE
CERTIFICATE OF CORRECTION

PATENT NO. : 4,424,771
DATED : January 10, 1984
INVENTOR(S) : Dale R. Lovercheck It is certified that error appears in the above-identified patent and that said Letters Patent are hereby corrected as shown below:

Col. 1, line 67, "Du" should read --Cu--
Col. 3, line 32, "along" should read --alone--
Col. 4, line 24, "along" should read --alone--
Col. 5, line 66, "along" should read --alone--
Col. 11, line 21, "either" should read --ether--
Col. 12, line 63, "proir" should read --prior--
Col. 13, line 5, "diisocia-" should read --dissocia---

Signed and Sealed this

Tenth Day of April 1984

[SEAL]

*Attest:*

GERALD J. MOSSINGHOFF

*Attesting Officer*  *Commissioner of Patents and Trademarks*